Dec. 20, 1960

R. P. WITT 2,965,708

TAPE RECORDING

Filed Sept. 29, 1954

INVENTOR
RICHARD P. WITT

BY

Wayne M. Hart
ATTORNEY

United States Patent Office 2,965,708
Patented Dec. 20, 1960

2,965,708

TAPE RECORDING

Richard P. Witt, Rockville, Md., assignor to ACF Industries, Incorporated, New York, N.Y., a corporation of New Jersey Filed Sept. 29, 1954, Ser. No. 459,125

6 Claims. (Cl. 178—6.6)

This invention relates generally to improvements in magnetic recording and particularly, to a method and apparatus capable of magnetically recording electrical signals, which when played back, provide visual representations.

The three magnetic recording techniques are longitudinal field, perpendicular field and transverse field recording. The present invention may employ any of these basic methods. In practice of the invention magnetic tracks are applied across the width of the paramagnetic medium and approximately normal to and coplanar with the direction of motion of the medium. The tracks are said to be transverse or transversely applied, but this means only the direction of application of the tracks on the paramagnetic medium with reference to the longitudinal axis of the medium. It is not to be construed to imply magnetic field direction. The illustrated form of the invention uses longitudinal field recording since this is by far the most common type, and the tracks are applied transversely across the tape.

The primary object of the invention is to provide a new apparatus and teach a new method of magnetically recording electrical signals having a bandwidth of from near zero to about five megacycles, such as video signals. This is accomplished by applying a large number of parallel recording tracks transversely across the tape, each track varying in magnetic intensity from point to point as each scan line of a television picture raster varies in luminosity. The composite video signal that produces the picture on the television cathode ray tube face is used to provide the variations in magnetic intensity of each track on the tape.

In the prior art magnetic recording of parallel tracks on a single tape has proven successful. In all known work in this field, the parallel tracks are utilized for independent information subject matter. Because of this independence of subject matter, crosstalk between the several tracks has been considered an undesirable effect. Even in those cases where there exists a relationship between the information on the adjacent tracks, no effort is known which exploited this relationship. It is an object of this invention to so orient successive magnetic tracks that advantage will be made of the similarities that exist in the recorded subject matter.

Video signal type of information sources such as television, utilize successive scans of nearly identical signal information content. By repetitively scanning the viewing screen with only a slight displacement of the scan line across the field of view, the complete signal information is obtained as luminance variations to form an image, with only small difference occurring from one scan line to the other. Subsequent display of a similar signal in the same order in which it was originally obtained and once again having only a slight displacement between subsequent lines makes it possible to obtain again the television image. If the successive television scan lines are recorded magnetically as tracks on a magnetic recording medium in an order similar to that which they would be displayed on a television viewing screen, successive lines will bear a great similarity in their magnetization. If the scan lines are placed as magnetic tracks transverse on the recording medium with respect to the motion of the tape and if the successive tracks are close to each other and with a full scan line of television video signal information presented as magnetic variations across the width of the tape, it will be possible to simplify playback.

In previous recording systems it was necessary that the playback head travel along the same path as the recording head in order to sense the recorded magnetic variations. However, if the playback head is capable of sensing all magnetic signals in an area approximately as long as the distance between two successive scan lines and as narrow as magnetically and mechanically convenient, a signal will be picked up which is essentially the same whether the playback transducer is traveling on precisely the same path position as the recording head previously traveled or whether it falls between two such path positions. In the case in which playback is achieved by traveling between two of the recorded television scan lines, a pick up signal equal to the average of the two lines is generated.

The pick up transducer must sense a width very nearly equal to the amount of separation between successive tracks. If the sensed area is significantly smaller than this amount, a stronger pick up signal would be obtained when exact tracking of one of the tracks occurs as opposed to falling between two tracks and picking up less than half of each of the two tracks. This is true whether the successive tracks overlap or are spaced from each other an amount sufficient to preclude or cause crosstalk. In order to economize on the amount of magnetic tape which is used in a given period of time, successive tracks may overlap slightly. In so doing, it is possible to use the same transducer for reproduction of the signals that was used for the initial recording. The invention is described in connection with the magnetic recordation of American television transmission but is not necessarily limited thereto. The principles of the invention are applicable to record other video signals, as are found in other countries. It is necessary that scan rate differences and others be taken into consideration in the design of equipment for video signals of a different content.

A single frame of a television picture requires one-thirtieth of a second on the face of the cathode ray tube, and in applying this single frame there is a scanning raster of nominally 525 lines. This means that nominally 15,750 scan lines appear on the face of the cathode ray tube in a single second, each scan line varying in luminous intensity from point to point, thereby forming the light contrast on the tube which in turn forms the picture. These numbers and speeds are said to be nominal in that there is some slight variation in transmission. The composite video signal produces these scanning lines and to have accuracy in recording, especially at such high speeds, the same composite signal is used for recording. Accordingly, another object of this invention is to provide a recording system which is rendered operative by the composite video signal of a television apparatus. A more specific object is to use the synchronous pulses to direct the magnetizing field across the tape at such a rate that the spot is directed across the face of the cathode ray tube in the television scan system, whereby the scan frequency is locked with the application of magnetic tracks on the magnetic medium. A further facet of this system is the utilization of the composite signal, that is, the sync pulse component together with the video information components between sync pulses, for producing a high frequency magnetic field, which fluctuates in magnetic intensity exactly in proportion to the luminous fluctuations of each scan line of the television picture raster. Combining this magnetic field production technique with the previously mentioned locked magnetic field directing system, tracks may be applied to the paramagnetic medium which vary in magnetic intensity in accordance with the light variations of the televison picture for producing the same.

A more succinct object of this invention is to provide on a magnetic medium an essentially homogeneous field of varying magnetic intensity which corresponds at each point to the luminous intensity of a corresponding point on a television raster for a single frame of the television picture. A corollary object of this invention is to teach a method which uses the steps of applying superjacent magnetic tracks on a paramagnetic medium, each track representing in magnetic variations a single scan line light variation parameter of a television frame raster.

The field of utility for a device which is capable of recording magnetically picture information is very large. It is not possible to describe and even mention all possible uses for the recording system; television programs at the transmission point would find good use for the recording system either for editing or for transmitting as is now done with kinescope, and another possible use is with the home television receiver. The illustrated embodiment of the invention will be described in connection with the latter use, although the invention is certainly not to be limited to such utility but may be used for recording any electrical signal in a bandwidth from about zero to about five megacycles, and the upper limit may be increased by changes in one part of the system, as will be described subsequently.

Other objects andn features of importance will become apparent in following the description of the illustrated form of the invention.

Figure 1:
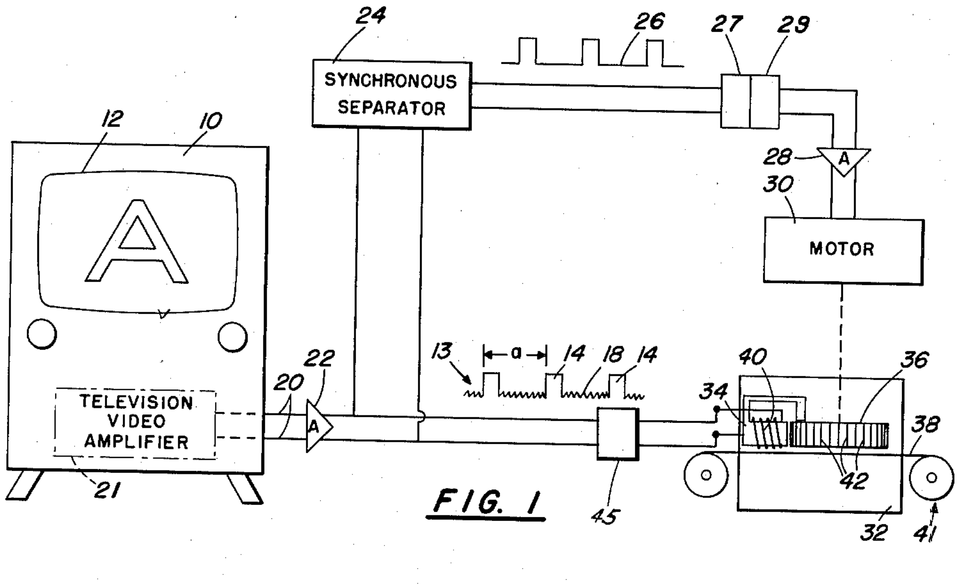
Fig. 1 is a schematic view of a single embodiment of the invention showing it attached with a conventional television receiver and also depicting steps involved in the method claimed herein.

The conventional television receiver 10 shown in Fig. 1, has the usual parts and components found in such receivers. Among these are the cathode ray tube 12 on the face of which appears a raster, and a video amplifier which supplies the composite electrical signal, ultimately to form a picture on the television picture tube face. A typical composite video signal 13 is shown in Fig. 1 and includes various components among which are the synchronous pulses 14 between which are the video information components 18, the latter being a voltage whose value fluctuates in order to vary the luminosity from point to point on each scanning line of the television picture.

The ordinary television receiver has a sync puluse separator from which the keying pulses are taken to trigger the scan lines at the nominal rate of 15,750 per second. This means that for a single television picture frame, lasting one-thirtieth of a second, there appears nominally 525 scanning lines for the raster.

It is entirely possible to use the sync separator of the television receiver 10 rather than supplying a separate one for the recording system, but since a sync separator 24 is so simple a device, it is supplied as a part of the recording equipment in the disclosed embodiment. Appropriate leads 20 are connected to the output of the television video amplifier 21 in order to obtain the composite video signal. If it is not intense enough, amplifier 22 is connected to leads 20 in order to bring it up to the desired level. Sync separator 24 which derives a signal such as shown at 26 from the composite video signal, is connected either before or after the amplifier and the sync separator derives a signal which has only the sync pulse component of the composite video signal. The sync pulse component is sent into a frequency divider 27 and from there into a filter 29 which passes only the fundamental frequency component of the divider. The output of this filter after amplification at 28, is used to actuate a synchronous motor 30 or the equivalent, the latter being mechanically connected to the transducer head which is schematically represented at 32.

Head 32 includes two pole members 34 and 36, respectively, pole member 34 being stationary with a pole surface 44 of a size slightly less than the width of the paramagnetic recording medium, in this instance, tape 38. Stationary pole member 34 has a magnetization coil 40 connected with it, and this coil supplies high frequency voltage which fluctuates in accordance with the video signal 13. Therefore, the magnetic field attributable to energization of the pole member 34 fluctuates in accordance with the video signal components 18 and sync pulse 14. Although not shown, linearization of the recording characteristics of the medium may be accomplished by using D.C. or A.C. bias of the proper frequency.

Figure 3:
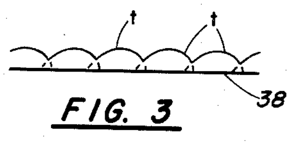
Fig. 3 is an enlarged side view of the paramagnetic medium, showing the imaginative overlapping relationship of the magnetic tracks.

A magnetic tape transport 41 operates at a speed calculated to provide the results shown in Fig. 3 when the tracks are to be laterally overlapped. Motor 30 rotates movable pole member 36 and this pole member has a number of magnetic elements 42 at its periphery, each being preferably in the form of a knife or wedge. They are spaced apart a distance similar to the length of the slightly curved stationary pole member surface 44. Member 36 is so close to the slightly curved surface 44 of the member 34 that upon rotation of the member 36 there is a very small recording gap which moves across tape 38, the transport 41 and other tape supporting means holding the tape very close to the bottom surfaces of the pole members 34 and 36 at least at the places where the recording gap is formed. Elements 42 at the periphery of the pole member 36 are spaced such that only one element sweeps across surface 44 at a time, but just as soon as one leaves surface 44 the next one on the rotation pole member 36 transverses surface 44 at a distance of about a mil. In the embodiment of the head illustrate and described, it will be necessary for the rotating member 36 to operate at a very high speed. For this reason the void between each element 42 may be filled by a non-magnetic insulating substance 50, the purpose being to reduce windage during rotation. Moreover, the pole member 36 may be made of nonmagnetic material and elements 42 radially set in it. The pole member 36 preferably has its elements 42 terminating in a point or near point to have high flux resolution in the recording gap.

*Operation*

Something was said previously about the basic operational pattern of an ordinary, home television receiver. The composite video signal 13 with or in the absence of amplification is applied to the magnetization coil 40 in the transducer head 32, after passing through the voltage to current convertor 45. This converter is intended to indicate any signal transformation arrangement usable in the circuit. For example such transformation may consist of A.C. or D.C. linearization bias (described supra); or the plate circuit of a pentode amplifier driving the head, which will provide a current signal source presenting a current to the head proportional to the voltage applied. In the television receiver the composite video signal is used as follows: the sync pulses 14 occur at the rate of 525 for each television picture frame and that takes one-thirtieth of a second. Each sync pulse 14 triggers a single scan line in the television picture raster. The information signal components 18 between the sync pulses 14 vary the luminosity from point to point of each scan line in order to produce the blacks, whites, and intermediate shades of gray so as to produce a picture, for example, that shown in Fig. 1. This same composite video signal 13 is the source of fluctuating electrical energy that is applied to magnetization coil 40. Therefore, the magnetic field varies in strength in direct proportion to the point to point light variation of each scan line in a television picture raster for a single frame.

In the television as it is known in this country, there are thirty frames per second and the persistency of the cathode ray tube face is such that a pleasant appearance is presented to the viewer. The composite video signal or one derived from it whose sync pulses are present at a frequency of 15,750 cycles per second are transmitted to the coil 40 in order to produce a fluctuating magnetic field, the fluctuations in field strength being locked with the luminescence fluctuations of the viewed picture on the cathode ray tube 12.

Assume that a single frame of television picture produces the image A as disclosed in Fig. 1, and the pulses required to produce this frame are also shown in the figure. A visual raster is produced by the scanning lines for the single frame disclosed in Fig. 1, and with the video composite signal which produces the raster, a field is substantially simultaneously produced on the magnetic tape 38, as seen in Fig. 2.

Figure 2:
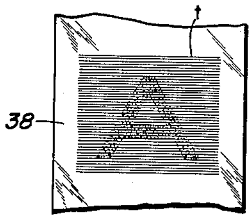
Fig. 2 is an enlarged top view of a portion of the magnetic medium showing an imaginative single field of television picture recorded thereon.
Figure 4:
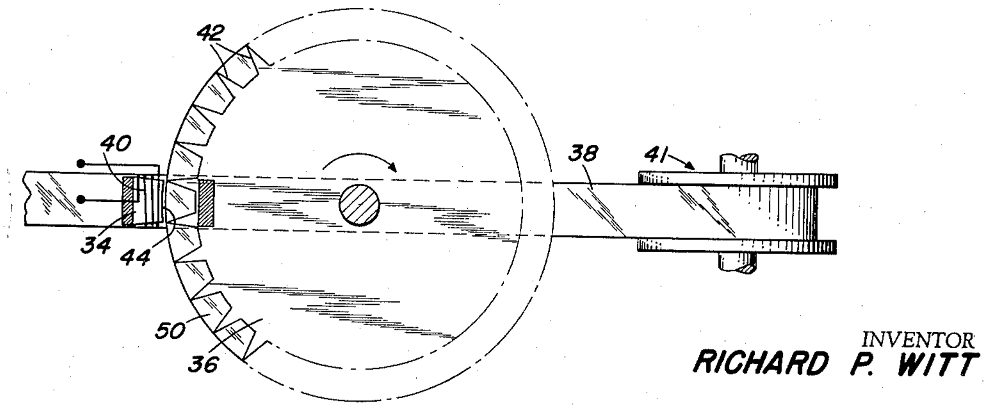
Fig. 4 is a fragmentary plan view partly in section showing the structural relationship between the transducer head and the recording medium.

It is apparent that merely producing a fluctuating magnetic field will not result in the visual representation shown in Fig. 2. Therefore, means must be provided to distribute the video information components of the composite video signal across the magnetic tape 38 in lines, one line being formed for each single scanning line of the raster. Although many devices may be used to accomplish this, rotating pole member 36 is selected in view of its simplicity. Use of the sync pulses as shown at 26 with frequency divider 27 and filter 29 to lock the speed of motor 30 obtains the necessary speed relationship between the sync signal components 14 and repetition rate of presentment of elements 42 to surface 44. The division ratio of divider 27 is determined by the number of poles in synchronous motor 30 and the number of elements 42 on head 32, the choice being such that one element 42 traverses across the tape for each of the 15,750 scan lines per second. Due to the inertia of the system and since the motor can operate only at the frequency which the scanning lines appear in the raster of the picture, the necessary phase stability between the application of magnetic tracks on the tape and the line frequency of the video signal is kept.

If nominally 15,750 lines per second are scanned on the cathode ray tube face, this means that nominally, the same number of magnetic tracks must be applied to the paramagnetic tape 38. To accomplish this in a practical way, pole member 36 has a large number of the magnetic elements 42. Assuming that the pole member 34 is one-half inch wide, and that the elements 42 have their edges quite sharp, so that the elements are spaced approximately one-half inch apart, then thirty elements 42 on rotating member 36 is a practical configuration. In order to sweep across the magnetic tape 38 at the rate of 15,750 times to apply that many magnetic tracks per second, a rotational speed of 31,500 revolutions per minute for member 36 is required. This is within the realm of practicability, and to have such a wheel would require a diameter of only about five inches. It is a logical extension of this principle to have a wheel ten inches in diameter with sixty projections 42 thereby reducing the rotational speed necessary to 15,750 revolutions per minute. These figures, of course, are approximate.

The distance *a* measured on the representation of the composite video signal 13 in Fig. 1, indicates the information supplied to the cathode ray tube 12 in order to produce a single scan line. The same distance *a* indicates the signal information supplied to the head 32 in order to form a single magnetic track on the tape 38. The speed of track application on tape 38 is related to the transport velocity, say, 30 inches, per second for a system using the estimations referred to previously herein, will mean that the tracks are so closely placed on the tape 38 that the tracks *t* overlap slightly in the lateral direction. If the tracks could be shown to have vertical height and width schematically, such as represented in Fig. 3, the overlap would be approximately as illustrated.

Since the overlapping magnetic lines provide a frame of television picture for each frame appearing on the cathode ray tube face, and since each magnetic track varies from point to point in magnetic intensity as each scan line varies from point to point in luminosity, if variations in magnetic strength were visible, the image of a single selected frame would be as shown in Fig. 2 for a picture as depicted on cathode ray tube 12. Magnetic intensities cannot be seen, without the aid of other mechanisms and devices, so if iron filings were placed on the field defining a television picture frame representation, a figure as shown in Fig. 2 would appear upon agitation of the filings. This is mentioned to emphasize the fact that the present recording method and apparatus magnetically records the video composite signal at line frequency and in scanning line strength.

Considering the operation of the invention in a little different way, stationary pole member 34 produces a magnetic field due to energization of its coil 40 by the composite video signal 13. For a single raster line the length *a* is used. For that length the signal voltage is in a state of fluctuation. This means that the coil 40 is energized by fluctuating voltage and means further that the magnetic field produced constantly fluctuates. The sync pulse in the length *a* sends the scanning line across the face of the cathode ray tube 12. The same pulse causes one of projections 42 on member 36 to be sent across surface 44 of the pole member 34. This means that the air gap between that projection 42 and surface 44 of member 34 moves across the tape 38 distributing the video information components within length *a* transversely across the tape. The successive movement of the gap transversely across the tape 38 distributes the effective (that used for recording) magnetic field across the tape 38 in successive sweeps.

Essentially the same equipment as described herein may be used for playback of the electrical signal information applied magnetically to tape 38. A very simple form of playback equipment would include a standard oscillator which is operated to feed an amplifier which in turn energizes a synchronous motor to drive the rotating pole member 36. By moving the tape below the air gap formed by the two pole members and feeding a signal proportional to the voltage induced by the head to the television video amplifier 21, picture information is supplied for operating a conventional television receiver.

The sound signal which is used with television pictures may be recorded on a separate narrow channel along the longitudinal length of the recording medium. This channel should be magnetically separated from that area of the recording medium which is utilized for the video signal recording. The area of external magnetic influence of the recording gap, that is, the region over which magnetic intensities are strong enough to cause magnetic recording, should be made small in order to minimize the total width and tape speed required for retaining the full initial information.

It is understood that various changes and modifications may be made without departing from the protection afforded by the following claims.

What is claimed is:

1. A signal recording and reproducing system comprising means providing a signal including synchronizing pulses repeated at a given frequency, a fixed electromagnetic pole piece, a movable magnetic pole piece movably mounted adjacent to said fixed pole piece and spaced therefrom a distance forming a magnetic air gap therebetween, a magnetic record mounted adjacent to said air gap for movement in a direction across said air gap between said fixed and movable pole pieces, a synchronous motor operatively connected to said movable magnetic pole piece to move said movable pole piece in a direction transverse to said direction of record movement, and motor control means connected between said signal providing means and said motor and including means for separating said synchronizing pulses from said signal, means receptive of said synchronizing signal for producing pulses at a submultiple of said given frequency as an output, means for smoothing and amplifying said submultiple frequency pulses to provide output sufficient to drive said motor at its synchronous speed so as to drive said movable pole piece across said magnetic record in a period of time equivalent to the time between said synchronizing signal pulses.

2. A signal recording and reproducing system comprising means providing a signal consisting of synchronizing pulses repeated at a given frequency, a fixed electromagnetic pole piece, a movable magnetic pole piece having a head portion movably mounted adjacent to said fixed pole piece and spaced therefrom a distance forming a magnetic air gap therebetween, a magnetic record mounted adjacent to said air gap for movement in a direction across said air gap between said fixed pole piece and said movable pole piece head portion, a synchronous motor operatively connected to said movable magnetic pole piece to move said head portion in a direction transverse to said direction of record movement, and motor control means connected between said signal providing means and said motor and including means for separating said synchronizing pulses from said signal, means receptive of said synchronizing signal for producing pulses at a submultiple of said given frequency as an output, means for smoothing and amplifying said submultiple frequency pulses to provide output sufficient to drive said motor at its synchronous speed so as to drive said pole piece head portion across said magnetic record repetitively in a period of time equivalent to the time between said synchronizing signal pulses.

3. A signal recording and reproducing system comprising means providing a signal including synchronizing pulses repeated at a constant frequency, a fixed electromagnetic pole piece, a movable magnetic pole piece having a head portion mounted for rotation adjacent to said fixed pole piece, said head portion having on its periphery a plurality of spaced elements each arranged to pass successively past said fixed pole piece at a distance forming a magnetic air gap therebetween, a magnetic record mounted adjacent to said air gap for movement in a direction across said air gap, means for moving said record at a constant speed across said air gap, a synchronous motor operatively connected to said movable magnetic pole piece to rotate said head portion and move said spaced elements successively past said fixed pole piece in a direction transverse to said direction of record movement, and motor control means connected between said signal providing means and said motor and including means for separating said synchronizing pulses from said signal, means receptive of said synchronizing signal for producing pulses at a submultiple of said given frequency as an output, means for smoothing and amplifying said submultiple frequency pulses to provide output sufficient to drive said motor at its synchronous speed so as to rotate said pole piece head portion at a speed to move each of said elements successively across said magnetic record in a period of time equivalent to the time between said synchronizing signal pulses.

4. A signal recording and reproducing system comprising means providing a signal including synchronizing pulses repeated at a constant frequency, a fixed electromagnetic pole piece, a movable magnetic pole piece having a head portion mounted for rotation adjacent to said fixed pole piece, said head portion having on its periphery a plurality of spaced elements each having a sharp tapered edge and arranged to pass successively past said fixed pole piece at a distance forming a magnetic air gap therebetween, a magnetic recording tape mounted adjacent to said air gap for movement in a direction along the length thereof and across said air gap, means for moving said recording tape at a constant speed across said air gap, a synchronous motor operatively connected to said movable magnetic pole piece to rotate said head portion and move said spaced elements successively past said fixed pole piece in a direction transverse to said direction of recording tape movement, and motor control means connected between said signal providing means and said motor and including means for separating said synchronizing pulses from said signal, means receptive of said synchronizing signal for producing pulses at a submultiple of said given frequency as an output, means for smoothing and amplifying said submultiple frequency pulses to provide output sufficient to drive said motor at its synchronous speed so as to rotate said pole piece head portion at a speed to move said tapered edge of each of said elements successively across the width of said magnetic recording tape within a period of time equivalent to the time between said synchronizing signal pulses.

5. A signal reproducing system comprising means providing a signal having synchronizing pulses repeated at a constant frequency, a fixed electromagnetic pole piece, an operative circuit connected to said fixed pole piece, a movable magnetic pole piece having a head portion mounted for rotation adjacent to said fixed pole piece and spaced therefrom a distance forming a magnetic air gap therebetween, a magnetic record mounted adjacent to said air gap for movement in a direction across said air gap, means connected to said magnetic record to move said magnetic record at a constant speed across said air gap, a synchronous motor operatively connected to said movable magnetic pole piece to rotate said movable pole piece, motor control means connected between said signal providing means and said motor and including means for separating said synchronizing pulses from said signal, means receptive of said synchronizing signal for producing pulses at a submultiple of said given frequency as an output, means for smoothing and amplifying said submultiple frequency pulses to provide output sufficient to drive said motor at its synchronous speed at which said pole piece head portion is driven across said record in a period of time equivalent to the time between said synchronizing signal pulses, and a receiver connected to said operative circuit to utilize currents generated in said operative circuit by magnetic fluctuations across said air gap initiated respectively by variations in the magnetic permeability of said record moving across said air gap.

6. A signal recording system comprising means providing a signal having a synchronizing component consisting of pulses repeated at a constant frequency, a fixed electromagnetic pole piece, a movable magnetic pole piece movably mounted adjacent to said fixed pole piece and spaced therefrom a distance forming a magnetic air gap therebetween, a magnetic record mounted adjacent to said air gap for movement in a direction across said air gap, means connected to said magnetic record to move said magnetic record at a constant speed across said air gap, a synchronous motor operatively connected to said movable magnetic pole piece to move said movable pole piece, motor control means connected between said signal providing means and said motor and including means for separating said synchronizing pulses from said signal, means receptive of said synchronizing signal for producing pulses at a submultiple of said given frequency as an output, means for smoothing and amplifying said submultiple frequency pulses to provide output sufficient to drive said motor at its synchronous speed so as to synchronize said motor speed to drive said movable pole piece across said record in a period of time equivalent to the time between two of said synchronizing signal pulses, and an operative circuit connected between said signal providing means and said fixed magnetic pole to provide a magnetic flux across said air gap whereby the magnetic permeability of said magnetic record is altered in accordance with the portion of said signal occurring within said period of time.

References Cited in the file of this patent

UNITED STATES PATENTS

| | | |
|---|---|---|
| 2,245,286 | Marzocchi | June 10, 1941 |
| 2,648,589 | Hickman | Aug. 18, 1953 |
| 2,690,473 | Cooley | Sept. 28, 1954 |
| 2,698,875 | Greenwood | Jan. 4, 1955 |
| 2,716,154 | Raibourn | Aug. 23, 1955 |
| 2,743,318 | De Forest | Apr. 24, 1956 |
| 2,876,295 | Irby | Mar. 3, 1959 |